United States Patent

[11] 3,599,491

[72] Inventor Donald I. Bohn
1501 N. Miracle Mill, Tucson, Ariz. 85705
[21] Appl. No. 842,115
[22] Filed July 16, 1969
[45] Patented Aug. 17, 1971

[54] QUICK RESPONSE RECORDING THERMOMETER
8 Claims, 3 Drawing Figs.

[52] U.S. Cl. .................................................. 73/349,
73/362 AR
[51] Int. Cl. .................................................. G01k 1/16,
G01k 7/22
[50] Field of Search .......................................... 73/362 AR,
349, 338.6, 343, 362 R; 338/57

[56] References Cited
UNITED STATES PATENTS
2,680,583 6/1954 Davis............................ 338/57
2,818,482 12/1957 Bennett........................ 73/362
2,894,391 6/1959 Colt............................. 73/338.6

Primary Examiner—Louis R. Prince
Assistant Examiner—Denis E. Corr
Attorney—Ostrolenk, Faber, Gerb & Soffen ABSTRACT: The galvanometer of an electrically driven recorder is connected to the output terminal of a bridge circuit, one leg of which consists of a plurality of thin disk temperature-sensing thermistors, disposed in a circular array positioned at the intake side of an axial blower in the airstream produced thereby. The thermistor faces are generally parallel to the direction of the airflow, so that the temperature of the thermistors changes rapidly and closely follows temperature changes of air impinging thereon.

INVENTOR.
DONALD I. BOHN
BY
OSTROLENK, FABER, GERB & SOFFEN
ATTORNEYS

QUICK RESPONSE RECORDING THERMOMETER

This invention relates to recording thermometers in general and more particularly relates to a thermometer of this type constructed to provide exceptionally quick response by utilizing thin platelike thermistors having their faces positioned generally parallel to the flow of air whose temperature is being measured.

While the prior art has provided many accurate temperature-measuring devices, for the most part accuracy was a function of the time required for the temperature-sensing to assume each new temperature being measured. That is, the longer the time the temperature-sensing element was subjected to each new temperature, the more accurate was the temperature readout.

In order to decrease the response time required to detect temperature changes, the instant invention utilizes a plurality of very thin thermistor disks arranged in a circular array, with the disk faces being parallel to flow of air in a stream generated by an axial blower. The air being moved by the blower is the medium whose temperature is being sensed. In particular, the thermistors chosen have a relatively large ration of surface area to mass times specific heat. These thermistors are connected in a series parallel arrangement to constitute one leg of a Wheatstone bridge having the galvanometer of a recording device connected to the output terminals thereof.

Accordingly, a primary object of the instant invention is to provide a novel construction for a quick response recording thermometer.

Another object is to provide a thermometer of this type utilizing a plurality of very thin platelike thermistors in one leg of a Wheatstone bridge, with the thermistors being subjected to a forced flow of the air whose temperature is being measured.

Still another object is to provide a thermometer of this type in which a plurality of disklike thermistors are disposed in a circular array positioned in a stream of air whose temperature is being measured.

These as well as other objects of this invention will become readily apparent after reading the following description of the accompanying drawings, in which.

Figure 1:
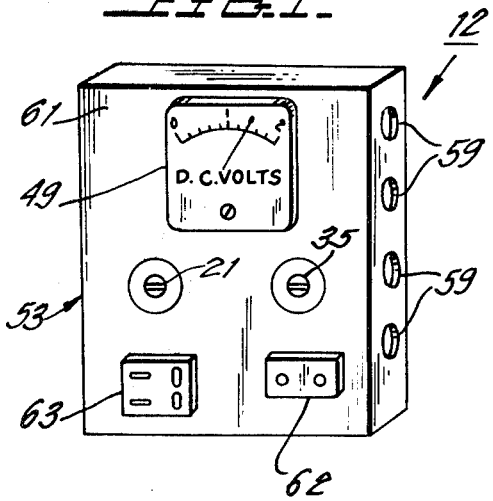
FIG. 1 is a perspective looking at the front and right sides of a housing containing essentially all the elements of a quick response recording thermometer, constructed in accordance with teachings of the instant invention, except for the actual recording unit.
Figure 2:
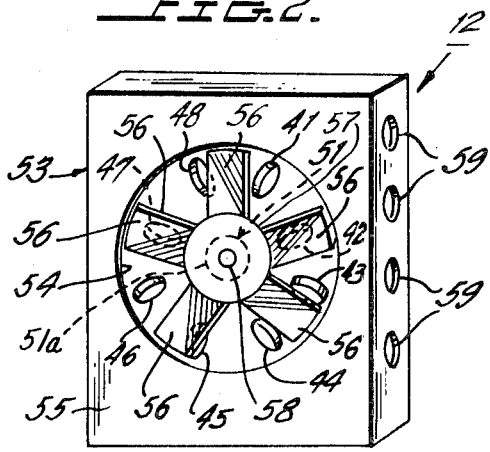
FIG. 2 is a perspective of the housing of FIG. 1, looking at the rear and left sides thereof.
Figure 3:
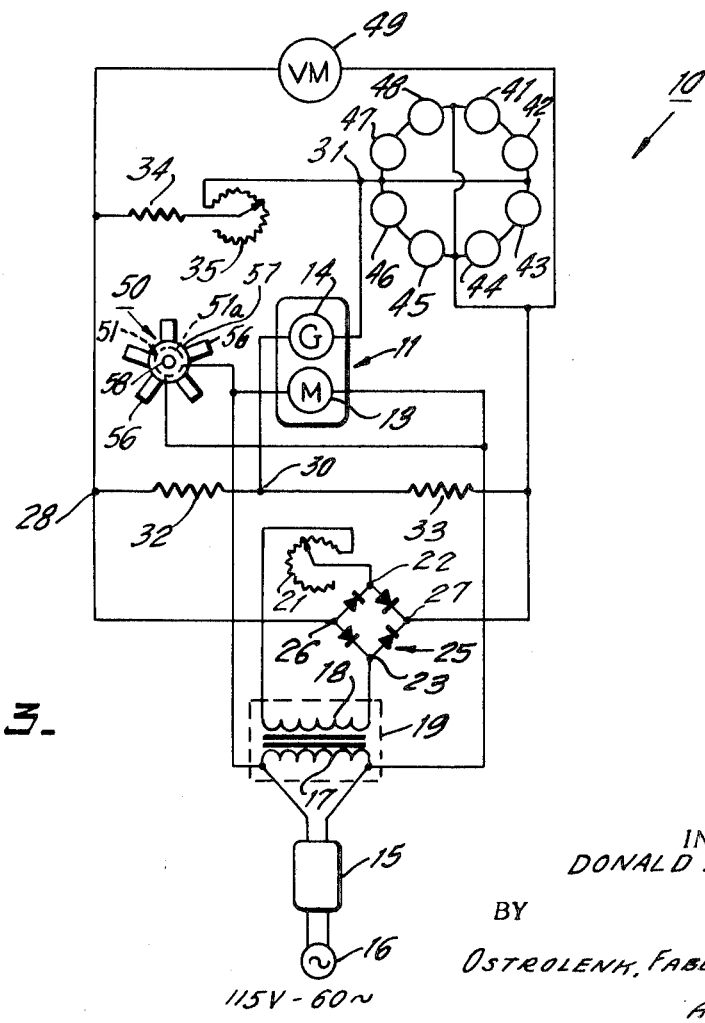
FIG. 3 is an electrical and mechanical schematic of a quick response recording thermometer constructed in accordance with teachings of the instant invention.

Now referring to the figures. Quick response recording thermometer 10 consists of two mechanically separate units, one of which is a conventional recording DC zero center millivoltmeter 11 (FIG. 3) and a temperature-sensing unit 12. Recording meter 11 includes synchronous motor 13 for driving a recording chart (not shown), in relation to the needle of galvanometer 14. Motor 13 is connected to the output terminals of voltage regulator 15, having input terminals connected to 115 volt, 60 cycle source 16. The output of voltage regulator 15 is also connected to primary winding 17 of stepdown transformer 19, having its secondary winding 18 connected through rheostat 21 to input terminals 22, 23 of rectifier bridge 25. The output terminals 26, 27 of rectifier 25 are connected to input terminals 28, 29 of a Wheatstone bridge having output terminals 30, 31 across which the coil of galvanometer 14 is connected.

The Wheatstone bridge impedance elements include equal low-ohm fixed resistors 32, 33, fixed resistor 34, variable resistor 35 and a plurality of thermistors 41—48. Resistor 32 is connected between terminals 28 and 30; resistor 33 is connected between terminals 29 and 30; the series combination of resistors 34 and 35 is connected between terminals 28 and 31; and a series-parallel connected array of thermistors 41—48 is connected between terminals 29 and 31. In particular, the series-parallel array consists of four parallel legs, with each leg consisting of a series connection of two different thermistors of group 41—48. In addition, calibrating voltmeter 49 is connected across Wheatstone bridge input terminals 28 and 29.

Synchronous motor 51 of fan 50 is connected across the output terminals of voltage regulator 15. Fan 50 is mounted within rectangular housing 53 of temperature-sensing unit 12, in alignment with circular outlet opening 54 in rear wall 55. The struts mounting motor 51 to housing 53, in a fixed position centered with respect to opening 54, are not shown. Fan 50 also includes a plurality of blades 56 extending radially outward from hub 57, the latter being keyed to motor output shaft 58. A protective screen (not shown) is fitted over opening 54.

When fan 50 is operated, it draws air into housing 53 through sidewall openings 59 and expels it out through opening 54. Thermistors 41—48 are disposed within housing 53, being positioned in a circular array immediately in front of fan blades 56 and positioned more radially outward than housing 51a for the rotor and stator (not shown) of motor 51 and more radially outward than the periphery of hub 57, but no farther outward than the tips of blade 56, so as to be positioned where airflow rate generated by fan 50 is relatively high. It is noted that the faces of thermistors 41—48 are positioned in planes that are generally radial with respect to motor output shaft 58, with these planes also being generally parallel to the air stream developed by fan 50.

Meter 49 is mounted to front wall 61 of housing 53, as are rheostats 21 and 35. Also at front wall 61 is two-place receptacle 62 for connecting unit 12 to AC source 16, and four-place receptacle 63 for connecting unit 12 to recording voltmeter 11.

In a practical quick response recording thermometer 10 for recording room temperature, zero center on galvanometer 14 is 75.5°. The initial adjustment requires a room temperature of 75.5° F. Under this condition, with thermometer 10 energized from AC source 16, rheostat 21 is adjusted to obtain any reasonable reading, such as 1.5 volts on meter 49, and rheostat 35 is then adjusted to have recorder 11 read 75.5° F. Now room temperature is changed by approximately 5° F. to some figure either above or below 75.5° F., and then rheostat 21 is adjusted to make recorder 11 read the exact room temperature.

The utilization of thin disk thermistors 41—48 disposed on the upstream side of fan blades 56 in the airstream produced thereby and the placing of the thermistor faces in planes parallel to the airstream result in an exceptionally quick response by thermometer 10 to changes in room temperature.

Although there have been described preferred embodiments of this novel invention, many variations and modifications will now be apparent to those skilled in the art. Therefore, this invention is to be limited, not by the specific disclosure herein, but only by the appending claims.

The embodiments of the invention in which I claim an exclusive privilege or property are defined as follows.

1. Temperature-measuring apparatus including fan means for generating a continuous airstream; a plurality of impedance elements connected to form an electrical bridge circuit having input and output terminals; first means providing a DC voltage applied to said input terminals; second means connected to said output terminals for providing an output related to degree of imbalance in said bridge circuit; said impedance elements in a first leg of said bridge circuit including a plurality of platelike members, each having a thickness that is relatively thin in relation to face dimensions thereof; each element of said plurality of impedance elements being disposed within said stream with both faces thereof in planes generally parallel to direction of airflow in said stream and said airflow being across both of said faces.

2. Temperature-measuring apparatus as set forth in claim 1, in which said fan means includes a motor and a plurality of blades extending radially from a shaft rotated by said motor; said plurality of platelike members being disposed in a circular array on the intake side of said blades.

3. Temperature-measuring apparatus as set forth in claim 2, in which said shaft constitutes the output shaft of said motor; said plurality of platelike members being disposed a greater distance from said shaft, measured radially, than the outside of the housing of said motor is spaced from said shaft.

4. Temperature-measuring apparatus as set forth in claim 2, in which said platelike members are thin disk thermistors.

5. Temperature-measuring apparatus as set forth in claim 2, in which there is a housing having a front wall, a rear wall and sidewalls connecting said front and rear walls; said platelike members disposed within said housing aligned with a circular air outlet opening in said rear wall; said fan means mounted to said housing with said blades positioned at said opening and rotating in a plane parallel to said rear wall; and a plurality of air inlet openings in said sidewalls.

6. Temperature-measuring apparatus as set forth in claim 5, also including a voltmeter mounted to said front wall and electrically connected to said input terminals; said first means including a first adjusting element for setting voltage applied to said input terminals; said plurality of impedance elements including a second adjusting element for balancing said bridge circuit; said first and second adjusting elements mounted to said housing.

7. Temperature-measuring apparatus as set forth in claim 5, in which said shaft constitutes the output shaft of said motor; said plurality of platelike members being disposed a greater distance from said shaft, measured radially, than the outside of the housing of said motor is spaced from said shaft; said first and second adjusting elements extending to said front wall for operation at the front of said housing.

8. Temperature-measuring apparatus as set forth in claim 7, in which said second means includes a galvanometer constituting part of a chart recorder.